Patented Nov. 4, 1930

1,780,196

UNITED STATES PATENT OFFICE

HANS LEHRECKE, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF DELAWARE

PROCESS FOR THE EVOLUTION OF HYDROCYANIC ACID

No Drawing. Application filed October 20, 1925, Serial No. 63,787, and in Germany October 27, 1924.

It is known that hydrocyanic acid will combine with metallic salts such as iron chloride, aluminum chloride, and the like and that these addition products on standing in the air will decompose with evolution of hydrocyanic acid. The foregoing knowledge has been made use of for the preparation of materials for the destruction of insect pests and the like. According to this invention the evolution of hydrocyanic acid from these addition products is brought about by treatment of these compounds with water in the presence of such materials as have a high heat of hydration and solution. Such compounds are, for example, iron chloride, aluminum chloride, zinc chloride, aluminum sulfate, magnesium chloride, zinc sulfate, calcium chloride and phosphoric anhydride and the like.

The preparation of these hydrocyanic acid materials can be carried out in several ways. For example, the hydrocyanic acid can be first added to the metallic salts after which the addition product formed is further mixed with the heat evolving substances as mentioned above. Since iron chloride, aluminum chloride and some other salts which are capable of forming addition products with hydrocyanic acid also belong to that class of materials which have a high heat of hydration and solution the products of this invention can be made by the addition of hydrocyanic acid to an excess of the salt in question. For example, iron chloride forms an addition product of hydrocyanic acid in the proportions of 1 mole of iron chloride to 2 moles hydrocyanic acid. If now 1½ moles of hydrocyanic acid are caused to add to a quantity of iron chloride corresponding to 1 mole there will then be ¼ of a mole of iron chloride in excess which is suitable for the evolution of heat required for this invention. It is, of course, possible to use for this heat evolution such salts as are not capable of combining with hydrocyanic acid. The use of this type of salt is of special importance when it is desired to dilute the hydrocyanic acid evolving material. The amount of heat evolving salt necessary in the evolution of hydrocyanic acid varies with the additions. If it is desired at any time to have a rapid evolution of hydrocyanic acid the amount of heat producing material will naturally be greater than if it were decided to evolve the hydrocyanic acid over a longer period of time.

In order to facilitate the use of these hydrocyanic acid producing materials it is often advisable to dilute them with inert ingredients as has been mentioned above. For this purpose it has been found that porous bodies such as pumice, diatomaceous earth, coke and the like are of special value; other materials which are advantageously employed are sand, saw-dust, finely ground salt and the like. In the preparation of our materials using these diluents we either prepare the hydrocyanic acid addition product and then mix it with the diluent, or we can mix the metallic salt and the diluent and then treat this mixture with the hydrocyanic acid. In this preparation it is usually advisable to heat the diluent till all water of crystallization has been driven off. A product prepared in this way gives up its hydrocyanic acid very rapidly due to the fine division and the distribution of the hydrocyanic acid containing material. This fact makes it very suitable for rapid action with high concentrations of hydrocyanic acid.

The evolution of hydrocyanic acid in the place to be treated is further aided by mixing the product as formed above with salts that are highly hygroscopic such as, for example, calcium chloride, anhydrous magnesium chloride and the like. In certain cases these hygroscopic bodies are advantageously used as diluents, or they may be incorporated into the mixture along with the diluents.

The application of these materials for the evolution of hydrocyanic acid is very simple. They may be simply scattered about the room to be treated. Because of the hygroscopic action of the salts, water is quickly taken up from the surrounding atmosphere and hydrocyanic acid evolved. In the use of those materials where no special hygroscopic salt has been added direct treatment with water may be used for the evolution of hydrocyanic acid.

When water is added for the evolution of hydrocyanic acid it has been found that the best results are secured when definite amounts of water are employed. Thus we have found it is of particular advantage to use from 6 to 12 moles of water for every mole of hydrocyanic acid addition product. By thus regulating the amount of water the hydrocyanic acid is so quickly evolved that the solution is rendered practically free of all dissolved gas.

In order to easily measure the correct amount of water at the place of use the containers for the hydrocyanic acid material may be only partially filled with the solids. Previous experience having determined the amount of water necessary for the material in the container a mark is placed on the container to denote the amount of water which should be added.

In the employment of these materials it is advisable if possible to use hot water for the evolution of hydrocyanic acid especially water over 60° C. It has been found for example that if an iron chloride-hydrocyanic acid is treated with water at ordinary temperatures that 45% of the contained hydrocyanic acid is evolved in 10 minutes. At the end of 30 minutes it is found that the amount of hydrocyanic acid liberated had only slightly increased showing that the reaction was now very slow. However, it is found that with water at 70° C. at the end of 10 minutes 82% and at the end of 30 minutes 91% of the hydrocyanic acid had been evolved. It is thus possible to adjust the rate of hydrocyanic acid evolution to any desired condition. For example, the minimum rate of hydrocyanic evolution is secured by using the addition product only. Then by fineness of division, addition of diluents, addition of heat evolving materials, addition of hygroscopic salts, use of water, and finally the use of hot water, or by any combination of these the rate of hydrocyanic acid evolution may be raised to any desired amount.

What I claim is:

1. Process for the evolution of hydrocyanic acid from addition products of hydrocyanic acid with metallic salts consisting in treating these addition products with water in the presence of salts of high heat of hydration and solution.

2. Method of destruction of pests by treating them with hydrocyanic acid consisting in placing in the space to be treated addition products of hydrocyanic acid with metallic salts mixed with hygroscopic salts of high heat of hydration and solution.

3. Process for the evolution of hydrocyanic acid from addition products of hydrocyanic acid with metallic salts consisting in mixing them with salts of high heat of hydration and solution, placing the mixture in a vessel in an enclosed space and treating them with water.

4. Process for the evolution of hydrocyanic acid from addition products of hydrocyanic acid with metallic salts consisting in mixing them with salts of high heat of hydration and solution, placing the mixture in a vessel in an enclosed space and treating them with water in proportions of 6 moles of water to one mole of hydrocyanic acid addition product used.

5. Product to be used in the destruction of pests consisting in a finely divided addition product of hydrocyanic acid with a metallic salt.

6. Product to be used in the destruction of pests consisting in a finely divided addition product of hydrocyanic acid with a metallic salt mixed with a hygroscopic salt.

7. Product to be used in the destruction of pests consisting in a finely divided addition product of hydrocyanic acid with a metallic salt mixed with a salt of high heat of hydration and solution.

8. Product to be used in the destruction of pests consisting in a finely divided addition product of hydrocyanic acid with a metallic salt with the presence of an excess of the metallic salt.

9. Product to be used in the destruction of pests consisting in a finely divided addition product of hydrocyanic acid and iron chloride.

10. Product to be used in the destruction of pests consisting in a finely divided addition product of hydrocyanic acid and iron chloride with the presence of an excess of iron chloride.

11. Method of fumigation which consists in placing in the space to be treated a mixture comprising an addition product of HCN with a metal salt, a metal salt of high heat of hydration and solution and a hygroscopic salt.

12. Method of fumigation which consists in placing in the space to be treated a mixture comprising an addition product of HCN with a hygroscopic metal salt of high heat of hydration and solution and an excess of said salt.

13. Method of fumigation which consists in placing in the space to be treated a mixture comprising an addition product of HCN with a metal salt and hygroscopic salt of high heat of hydration.

Signed at Frankfort-on-the-Main, Germany, this 30th day of Sept., A. D. 1925.

Dr. HANS LEHRECKE.